United States Patent [19]

Scholl et al.

[11] Patent Number: 4,797,435
[45] Date of Patent: Jan. 10, 1989

[54] USE OF 3-BENZALPHTHALIDES AS UV STABILIZERS FOR THERMOPLASTIC, AROMATIC POLYESTERS, POLYCARBONATES AND POLYESTER CARBONATES

[75] Inventors: Thomas Scholl; Volker Serini, both of Krefeld; Dietrich Rathmann, Leverkusen, all of Fed. Rep. of Germany; Ross Savage, Newtownards, Ireland; Klaus Kircher, Leverkusen, Fed. Rep. of Germany

[73] Assignee: Bayer Aktiengesellschaft, Leverkusen, Fed. Rep. of Germany

[21] Appl. No.: 2,749

[22] Filed: Jan. 12, 1987

[30] Foreign Application Priority Data

Jan. 23, 1986 [DE] Fed. Rep. of Germany ....... 3601900

[51] Int. Cl.⁴ ............... C08K 5/34; C08K 5/48; C08K 5/49
[52] U.S. Cl. ........................ 524/89; 524/93; 524/94; 524/109; 524/111; 524/112
[58] Field of Search ............. 524/89, 93, 94, 109, 524/111, 112; 549/304, 305, 307

[56] References Cited

U.S. PATENT DOCUMENTS

| | | | |
|---|---|---|---|
| 1,892,769 | 1/1933 | Jaeger | 524/111 |
| 1,941,474 | 1/1934 | Jaeger | 524/111 |
| 2,489,972 | 11/1949 | Mowry et al. | 549/307 |
| 2,782,181 | 2/1957 | Shekleton | 524/111 |
| 2,810,731 | 10/1957 | Shekleton | 524/111 |
| 3,565,956 | 2/1971 | Shulenberg et al. | 549/307 |
| 4,325,863 | 4/1982 | Hinsken et al. | 524/94 |
| 4,333,920 | 6/1982 | Conner | 424/59 |

OTHER PUBLICATIONS

Patterson et al, "The Ring Index" (American Chemical Society, Second Edition, 1960), p. 173.
"Naming and Indexing of Chemical Substances for Chemical Abstracts during the Seventh Collective Period", Chemical Abstracts (1962), pp. 58,57,23,35, 38–42, 46, 53 60 and 64.
Chemical Abstracts, vol. 86, Nr. 18, May 2, 1977, p. 30, Xusammenfassung 122191j, Columbus, OH, US; M. M. Islam et al.
"Benzalphthalimidines and related compounds. Part III. 3-(p-Nitrobenzal) phthalimidines as stabilizers for PVC" & Egypt.

*Primary Examiner*—Kriellion Morgan
*Attorney, Agent, or Firm*—Connolly and Hutz

[57] ABSTRACT

Optionally substituted 3-benzalphthalides are effective UV stabilizers for thermoplastic aromatic polyesters, polycarbonates and polyester carbonates.

6 Claims, No Drawings

USE OF 3-BENZALPHTHALIDES AS UV STABILIZERS FOR THERMOPLASTIC, AROMATIC POLYESTERS, POLYCARBONATES AND POLYESTER CARBONATES

The invention relates to the use of optionally substituted 3-benzalphthalides as UV stabilizers for thermoplastic aromatic polyesters, polycarbonates and polyester carbonates.

Thermoplastic aromatic polyesters, polycarbonates and polyester carbonates are, on account of their excellent properties, desirable construction materials. They are even used or recommended for preparing films. In some applications, however, it is undesirable that these thermoplastics are, on account of their high contents of aromatic units, sensitive to UV radiation. This has the consequence that the products yellow on prolonged exposure to light. The undesirable degradation and rearrangement reactions responsible for the discoloration cause not only the appearance to suffer but impair also the other, in particular the mechanical, properties.

It has now been found that optionally substituted 3-benzalphthalides, as effective stabilizers, largely prevent the above-described consequences of UV irradiation in the case of aromatic polyesters, polycarbonates and polyester carbonates.

The positions of the optionally present substituents of the 3-benzalphthalide are subject, for the purposes of this invention, to the following numbering:

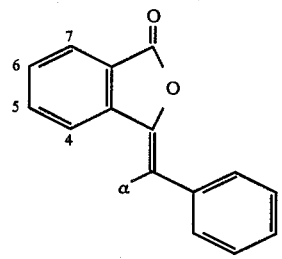

3-Benzalphthalides to be used according to the invention conform to the formula

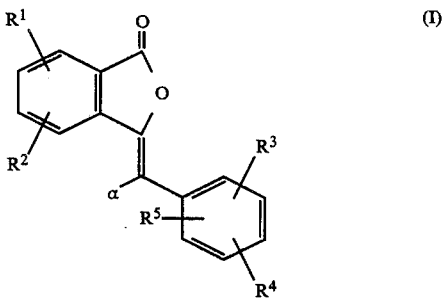

wherein
$R^1$–$R^5$ and $\alpha$ denote
—R,
—OR,
—COOR,
—CN,
—COONR$_2$,
—halogen or
$R^1$ and $R^2$ together and/or two of the substituents $R^3$–$R^5$ together denote
—CO—O—CO—or
—CO—NH—CO—and
R denotes hydrogen,
a $C_1$–$C_{30}$-, preferably a $C_1$–$C_{12}$-, hydrocarbon radical, such as, for example, $C_1$–$C_6$-alkyl, in particular methyl, $C_6$–$C_{10}$-aryl, in particular phenyl, $C_{6-10}$-Ar-$C_1$–$C_4$-alkyl, in particular benzyl. In preferred 3-benzalphalides
$R^1$–$R^5$ denote
hydrogen,
hydroxyl,
carboxyl,
carb-$C_1$–$C_4$-alkoxy,
methyl,
methoxy,
phenyl,
cyano,
chlorine or
$R^1$ and $R^2$ together and/or two of the substituted $R^3$–$R^5$ together denote
—CO—O—CO—.

Specific representatives of preferred 3-benzalphthalides are
6- and 7-chloro-3-benzalphthalide,
4-, 4'- and 6-methyl-3-benzalphthalide,
4'-chloro-3-benzalphtalide,
α-carbobutoxy-3-benzalphthalide,
4.5- and 4.7-dimethyl-3-benzalphthalide,
6-hydroxy-3-benzalphthalide,
4', 6-dihydroxy-3-benzalphthalide and
3-benzalphthalide-4'.6-dicarboxylic acid.
Particular preference is given to
6-carbethoxy-3-benzalphthalide and
3-benzalphthalide-5.6-dicarboxylic anhydride.
The most preferred representatives are
3-benzalphthalide (unsubstituted),
5- and 6-phenyl-3-benzalphthalide and
3-benzalphthalide-6-carboxylic acid.

3-Benzalphthalide itself and processes for its preparation are known; cf. for example Beilstein, 2nd supplement, volume XVII, page 399; Organic Synthesis Coll. Vol. II, 61 (1943); DE-OS (German Published Specification) No. 3,002,304 and U.S. Pat. No. 4,333,920. For instance, phthalic anhydride can be reacted with phenylacetic acid, alkyl or phenyl phenylacetate or benzylcyano to give the 3-benzalphthalide. The substituted 3-benzalphthalides are at least partly known; they can be prepared in analogous reactions from correspondingly substituted phthalic anhydrides and correspondingly substituted phenylacetic acid (derivatives) or benzylcyanides. The reaction can be carried out either in inert solvents such as aromatics (toluene, xylene, mesitylene) under reflux, if desired in the presence of customary Knoevenagel catalysts (such as piperidine/glacial acetic acid or β-alanine), possibly under a water separator, or without solvent, preferably at temperatures of 180° to 250° C.

The optionally substituted 3-benzalphthalides are suitable for use as UV stabilizers in particular for aromatic polyesters, aromatic polycarbonates and aromatic polyester carbonates.

Preferred aromatic polyesters are those based on isophthalic and/or terephthalic acid, diphenols (preferably bisphenol-A), chain terminators and optionally branching agents having relative viscosities of 1.2 to 2.0, measured in 0.5% by weight strength solution in dichloromethane; the preferred aromatic polyesters include also thermotropic polyesters (cf. DE-OS (German Published Specification) Nos. 3,325,703, 3,325,704, 3,325,705, 3,325,787, 3,338,623, 3,415,530, 3,419,749).

Preferred aromatic polycarbonates are the reaction products of phosgene or another carbonate precursor and at least one diphenol, preferably bisphenol-A, o.o-.o'.o'-tetramethylbisphenol-A or their halogenated derivatives, having weight-average molecular weights of 10,000 to 200,000, preferably of 20,000 to 80,000.

Preferred aromatic polyester carbonates are those based on diphenols (preferably bisphenol-A), isophthalic and/or terephthalic acid, phosgene or another carbonate precursor, chain terminators and optionally branching agents having relative viscosities of 1.2 to 2.0, in particular 1.2 to 1.5, measured in 0.5% by weight strength solution in dichloromethane to 25° C.

The UV stabilizers to be used according to the invention can be used in amounts of 0,01 to 10, preferably 1 to 4, % by weight, relative to thermoplastic.

The incorporation into the thermoplastics is in general effected in the melt of the thermoplastics, for example on extruders.

A. Preparation of 3-benzalphthalides: 3-Benzalphthalide 1000 g of phthalic anhydride, 1100 g of phenylacetic acid and 26 g of sodium acetate were heated together to 220° to 240° C. for 6 hours, during which 120 ml of water gradually distilled off. The remaining product was recrystallized from 4 liters of ethanol. Melting point 101°–102° C.

6-Phenyl-3-benzalphthalide 483.4 g of diphenyl-3,4-dicarboxylic acid and 271.8 g of phenylacetic acid were heated together with 2.4 g of sodium acetate to 220°–240° C., so that 72 ml of water distilled off (about 8 hours). This was followed by recrystallization from ethyl acetate. Pale yellow crystals, melting point 187° C.

Butyl 3-benzalphthalide-α-carboxylate 96 g of butyl phenylacetate, 74 g of butyl phthalate and 1 g of sodium acetate were heated to about 220°–240° C., so that 9 ml of water were eliminated (about 14 hours). After cooling down the crystals were filtered off with suction and washed with ligroin. Melting point 77°–79° C.

3-Benzalphthalide-5-carboxylic acid 96 g of trimellitic anhydride, 91.7 g of phenylacetic acid and 1.95 g of sodium acetate were heated to 220°–240° C. for 8 hours, so that 9 ml of water distilled off. This was followed by cooling down, addition of about 500 ml of ethanol and filtration. This gave yellow crystals having a melting point of 261° C.

B. Polyester carbonate used:

Aromatic polyester carbonate from isophthalic and terephthalic acid (1:1), bisphenol A and phosgene with isooctyl end groups, a molar ester/carbonate ratio of 41.5:58.5 and a relative viscosity of 1.29, measured as indicated in the description.

C. Polycarbonate used:

Aromatic bisphenol A polycarbonate with isooctyl end groups and a relative viscosity of 1.290, measured in dichloromethane.

EXAMPLE 1

Polyester carbonate B with 1% by weight, relative to polyester carbonate, of 3-benzalphthalide.

EXAMPLE 2

Polyester carbonate B with 1% by weight, relative to polyester carbonate, of 6-phenyl-3-benzalphthalide.

COMPARISON

Polyester carbonate B with 1% by weight, relative to polyester carbonate, of 2-hydroxy-4-methoxybenzophenone.

WEATHERING

The products of Examples 1 and 2 and the comparison were irradiated in the form of 0.2 mm thin films in a xenon weather-o-meter for 72 hours. In each 15-minute cycle 5 minutes were taken up with water spraying.

| Product | Before exposure to light | After 72 hours |
|---|---|---|
| As per Example 1 | colourless | colourless |
| As per Example 2 | colourless | colourless |
| As per comparison | slightly yellow | yellow |

INJECTION MOULDING (a) Product as per Example 1
(b) Product analogous to Example 1 with 3% by weight of stabilizer
(c) Product as per comparison
(d) Product analogous to comparison with 3% by weight of stabilizer.

Products (a) to (d) were injection-moulded at a material temperature of 350° C. to give sample platelets measuring 40×60×4 mm. The transmission at 420 nm was measured as a measure of yellowing.

| Product | Transmission at 420 nm (against air) |
|---|---|
| a | 61.0 |
| b | 53.3 |
| c | 53.0 |
| d | 41.2 |

It is seen that the samples stabilized according to the invention are distinctly less yellow than the state of the art samples even before the exposure to light.

EXAMPLE 3

5000 g of polycarbonate C and 25 g of 3-benzalphthalide were mixed at 300° C. on an extruder and injection-moulded at a material temperature of 290° C. to give sample platelets measuring 40×60×4 mm.

The sample platelets were subjected to a weathering test (xenon test 150); thereafter the transmission was measured.

| Weathering time [hours] | Transmission (Standard illuminant C) | |
|---|---|---|
| | with 3-benzalphthalide | without benzalphthalide |
| 0 | 88.6 | 89.5 |
| 500 | 88.8 | 87.2 |
| 1000 | 87.8 | 85.4 |
| 2000 | 84.1 | 78.7 |

We claim:

1. Thermoplastic polymers selected from the group consisting of aromatic polyesters, polycarbonates and polyester carbonates stabilized against ultraviolet light with a stabilizing amount of 3-benzalphthalides.

2. Polymers according to claim 1, where the 3-benzalphthalides conform to the formula

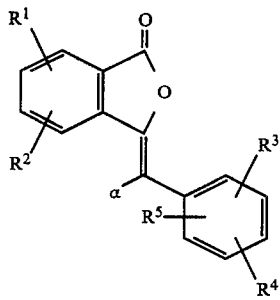

wherein
$R^1$–$R^5$ and $\alpha$ denote
—R,
—OR,
—COR,
—CN,
—CONR$_2$,
—halogen or
$R^1$ and $R^2$ together and/or two of the substituents $R^3$–$R^5$ together denote
—CO—O—CO—or
—CO—NH—CO—and
R denotes hydrogen or a $C_1$–$C_{12}$-hydrocarbon radical.

3. Polymers according to claim 2, where
$R^1$–$R^5$ denote
hydrogen,
hydroxyl
carboxyl
carb-$C_1$–$C_4$-alkoxy,
methyl,
methoxy,
phenyl,
cyano,
chlorine or
$R^1$ and $R^2$ together and/or two of the substituents $R^3$–$R^5$ together denote
—CO—O—CO—
and R denotes hydrogen, $C_1$–$C_6$-alkyl, $C_6$–$C_{10}$-aryl or $C_6$–$C_{10}$-Ar-$C_1$–$C_4$-alkyl.

4. Polymers according to claim 1 where the 3-benzalphthalide has been selected from the series 3-benzalphthalide, 5- and 6-phenyl-3-benzalphthalide and 3-benzalphthalide-6-carboxylic acid.

5. Polymers according in claim 1 wherein the amount of stabilizer is 0.01 to 10% by weight relative to thermoplastic.

6. Polymers according to claim 1 wherein the amount of stabilizer is 1 to 4% by weight relative to thermoplastic.

* * * * *